Patented Feb. 13, 1923.

1,445,503

UNITED STATES PATENT OFFICE.

GEORGE FULLER, LEONARD FULLER, AND GEORGE JOHN ANDREW FULLER, OF CHADWELL HEATH, LONDON, ENGLAND.

GALVANIC BATTERY.

No Drawing. Application filed February 16, 1921. Serial No. 445,450.

*To all whom it may concern:*

Be it known that we, GEORGE FULLER, LEONARD FULLER, and GEORGE JOHN ANDREW FULLER, subjects of His Majesty the King of England, and residents of Chadwell Heath, in the county of London, Kingdom of England, have invented certain new and useful Improvements in Galvanic Batteries, of which the following is a specification.

This invention relates to improvements in galvanic batteries of the kind in which the electrolyte or excitant material is filled in, in a dry or non-active condition, in order that a battery so filled will not show any appreciable voltage, and all action is prevented until it is required for use, when it is rendered active by the addition of liquid poured through the filling opening.

In the specification of our earlier British Letters Patent No. 102,294 we describe a method of manufacture where the electrolytic mixture containing ammonium and zinc chloride and gum tragacanth or similar material is dried before being filled in the battery. The zinc chloride being a deliquescent salt possessing hygroscopic properties renders this drying operation necessary in order that the electrolytic mixture can be in a sufficiently non-active condition when filled into the cell, and so that no appreciable voltage is shown and local action prevented.

The object of this invention is to produce a battery which shall be absolutely inert when made, which shall not be expensive to manufacture and which shall remain inert with more certainty than those hitherto provided.

In carrying out the present invention, we form a dry electrolyte by mixing a dry excitant such as ammonium chloride with dry gum, tragacanth, tapioca, or other similar or other suitable material or materials, and we refrain from using in our electrolytic mixture materials possessing hygroscopic properties to such an extent as zinc chloride. In certain cases we prefer to mix or arrange a small quantity of zinc chloride with the depolarizing material surrounding the inner carbon electrode, suitably drying the mixture after the addition of the zinc chloride.

In order to prepare this dry electrolytic mixture, suitable results may be obtained by mixing from 50 to 90 per cent of the excitant material such as ammonium chloride with 10 to 50 per cent by weight, of the absorbent material such as gum, tragacanth, tapioca, or other suitable material.

The materials used in the electrolyte must be suitably dried before mixing.

In this dry condition the electrolyte can be filled into the cell between the carbon and zinc elements. The case is then closed and sealed in any suitable manner. The dry electrolytic mixture when sealed in the battery will remain dry and inactive for long periods, and a battery manufactured in the way described will not show any appreciable voltage when tested with a voltmeter. The cell can be safely stored without deterioration and is suitable for use under all climatic conditions.

When required for use, water is added through the filling opening. This saturates the electrolytic material causing it to become gelatinous, and makes a suitable conducting path between the elements of the cell.

What we claim is:—

1. In a dry galvanic battery of the kind described, an electrolytic mixture comprising pre-dried excitant material of less hygroscopic nature than zinc chloride, and pre-dried gum, the materials when mixed and filled into the battery causing no appreciable voltage while in the dry condition.

2. A dry battery comprising an inner carbon electrode, an outer zinc electrode, a separator of dry excitant material including pre-dried ammonium chloride and tragacanth, a de-polarizing material surrounding the said inner carbon electrode, and zinc chloride mixed with the depolarizing material.

In testimony whereof we have hereunto signed our names.

GEORGE FULLER.
LEONARD FULLER.
GEORGE JOHN ANDREW FULLER.